United States Patent [19]

Rufer et al.

[11] Patent Number: 4,536,553

[45] Date of Patent: Aug. 20, 1985

[54] MODIFIED SILICON ELASTOMERS HAVING IMPROVED FLEX LIFE AND METHOD THEREFOR

[75] Inventors: Rosalyn J. Rufer, Greenbush; Walter H. Filbert, Clifton Park, both of N.Y.

[73] Assignee: General Electric Company, Waterford, N.Y.

[21] Appl. No.: 529,422

[22] Filed: Sep. 6, 1983

[51] Int. Cl.³ .................... C08L 83/06; C08L 83/10
[52] U.S. Cl. .................... 525/106; 525/100
[58] Field of Search ................ 525/106, 100

[56] References Cited

U.S. PATENT DOCUMENTS

| | | | |
|---|---|---|---|
| 2,438,612 | 3/1944 | MacKenzie et al. | 556/465 |
| 2,596,967 | 5/1952 | Frost | 556/450 |
| 2,645,628 | 7/1953 | Hurd | 556/450 |
| 2,716,638 | 8/1955 | Cohen et al. | 556/453 |
| 2,909,548 | 10/1959 | Bailey et al. | 526/279 |
| 2,965,593 | 12/1960 | Dietz | 525/479 |
| 3,326,869 | 6/1967 | Perrone | 525/106 |
| 3,439,014 | 4/1969 | Patton et al. | 556/450 |
| 3,474,123 | 10/1969 | Kelly et al. | 556/453 |
| 3,487,123 | 12/1969 | Bauer et al. | 526/279 |
| 3,644,306 | 2/1972 | Longi et al. | 526/279 |
| 3,694,478 | 9/1972 | Adams et al. | 556/453 |
| 3,865,897 | 2/1975 | Falender et al. | 525/100 |
| 4,014,851 | 3/1977 | Bluestein | 524/425 |
| 4,166,078 | 8/1979 | Getson | 556/451 |
| 4,172,101 | 10/1979 | Getson | 556/453 |
| 4,201,698 | 5/1980 | Itoh et al. | 525/106 |
| 4,252,915 | 2/1981 | Bartos | 525/106 |

OTHER PUBLICATIONS

Annual Book of ASTM Standards, Part 37, pp. 175–177, [ASTM D 813 59] "Standard Test Method for Rubber Deterioration–Crack Growth".

*Primary Examiner*—Wilbert J. Briggs, Sr.

[57] ABSTRACT

A silicone elastomer having improved flex life and a method of improving the flex life of silicone elastomers having olefinic unsaturation is described. The flex life of silicone elastomers having olefinic unsaturation is improved substantially by mixing vinyl acetate ethylene copolymer with the silicone elastomer in the presence of a free radical catalyst at an elevated temperature. In a preferred embodiment, methyl vinyl silicone rubber is mixed with vinyl acetate copolymer in the presence of dicumyl peroxide at an elevated temperature to provide a silicone elastomer having improved flex life.

24 Claims, No Drawings

MODIFIED SILICON ELASTOMERS HAVING IMPROVED FLEX LIFE AND METHOD THEREFOR

BACKGROUND OF THE INVENTION

This invention relates to modified organopolysiloxanes and a method of increasing the flex life of organopolysiloxanes, and more particularly, to improved silicone elastomers having olefinic unsaturation and a method of improving the flex life of silicone elastomers having olefinic unsaturation.

Modified organopolysiloxanes have been prepared in the prior art by polymerizing monomers containing aliphatic unsaturation in the presence of organopolysiloxanes containing terminal hydroxyl or hydrolyzable groups and free radical initiators. Other modified organopolysiloxanes have been made by gradually adding a mixture of monomers and free radical initiators to the preheated organopolysiloxanes, and in other cases, free radical initiators have been gradually added to a preheated mixture containing an organic polysiloxane and an organic monomer having aliphatic unsaturation. Various of these modified organopolysiloxanes have a tendency to shrink during curing, and accordingly, they are undesirable when the composition is used as a molding or potting composition. In other instances the agent used to modify the organopolysiloxane may have an adverse effect on such properties as hardness, tensile strength, elongation, elasticity, tear, flex and the like.

Other materials have also been used to modify various organopolysiloxanes. In U.S. Pat. No. 4,014,851 vinylorganopolysiloxane compositions have been modified by filling them with polyolefin wherein monomers having aliphatic unsaturation are polymerized in the presence of vinylorganopolysiloxanes and free radical initiators to improve the properties of the vinyl organopolysiloxanes. In certain other cases, improvements in properties have been attempted by grafting organopolysiloxanes, that is, providing organopolysiloxanes which are chemically grafted with polymeric side chains. However, while graft modified organopolysiloxanes have some desirable properties, they are inadequate in others, such as, poor solvent resistance and the like, and accordingly, they have not met with complete satisfaction. In U.S. Pat. No. 4,014,851, the finely-divided solid particles of homopolymer or copolymer which are formed in-situ, appear to act as reinforcing or semi-reinforcing fillers or in some cases extending fillers, for the vinyl organopolysiloxane matrix material resulting in an improved stronger silicone elastomer product. Although the compositions formed in U.S. Pat. No. 4,014,851 have improved properties and appear to have overcome the prior art deficiencies, it is still advantageous to improve various properties of the organopolysiloxanes.

SUMMARY OF THE INVENTION

Accordingly, it is an object of the present invention to provide a method of improving the flex life of silicone elastomers having olefinic unsaturation.

Another object of the present invention is to provide a silicone elastomer containing olefinic unsaturation having improved flex life.

Still another object of the present invention is to provide improved modified silicone elastomers having olefinic unsaturation by using polymeric filler materials which provide improved flex life without compromising or otherwise causing an adverse effect on other physical properties of the elastomer compound.

It is another object of the present invention to provide a method of improving the flex life of silicone elastomers having olefinic unsaturation without any substantial adverse effect on such properties as hardness, tensile strength, elongation, elasticity, tear and the like.

These and other objects are achieved by using vinyl acetate ethylene copolymer in the silicone elastomers having olefinic unsaturation to increase the flex life. An increase in the flex life of the silicone elastomers having olefinic unsaturation has been observed by the addition of vinyl acetate ethylene copolymer to the silicone elastomer compound without any substantial adverse effect upon the other physical properties of the silicone elastomer. Silicone elastomers having olefinic unsaturation which are modified by vinyl acetate ethylene copolymer uniformly dispersed in the silicone elastomers and cured in the presence of free radical initiators, unexpectedly show substantial improvements in flex life, and there is substantially little or no adverse effect on such properties as hardness, tensile strength, elongation, elasticity, tear and the like, and in fact, it has been observed that certain of these properties show improvement.

In accordance with the present invention, the flex life of silicone elastomers having olefinic unsaturation has been improved by mixing vinyl acetate ethylene copolymer with the silicone elastomer having olefinic unsaturation in the presence of a free radical catalyst at an elevated temperature. In accordance with the present invention, there is also provided a silicone elastomer having improved flex life comprising a silicione elastomer having olefinic unsaturation and about 2.0% to about 10.0% by weight vinyl acetate ethylene copolymer crosslinked in the presence of a free radical catalyst.

As used herein, silicone elastomer having olefinic unsaturation and vinyl organopolysiloxane or vinyl silicone rubber are used interchangeably.

These and various other objects, features and advantages of the invention can be best understood from the following detailed description.

DETAILED DESCRIPTION OF THE INVENTION

The silicone elastomers having olefinic unsaturation (vinyl organopolysiloxanes) useful in the practice of the present invention are well known and must be in the form of gums or solids in order to improve the flex life in accordance with the present invention. Since the vinyl acetate ethylene copolymer must be uniformly dispersed in the silicone elastomer having olefinic unsaturation by appropriate mixing, the silicone elastomers having olefinic unsaturation must be of a suitable consistency to permit the mixing, dispersing or blending of the vinyl acetate ethylene copolymer therein, or the silicone elastomer having olefinic unsaturation must be capable of softening (of sufficient green strength) to the extent that the vinyl acetate ethylene copolymer may be dispersed therein.

Generally, the silicone elastomers having olefinic unsaturation which may be used in accordance with at least some of the objects of the invention, are defined by the unit formula

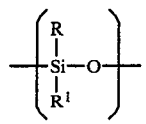 (1)

where each R and R' is a monovalent hydrocarbon radical, a substituted hydrocarbon radical or mixtures thereof, and where at least one R or R' per siloxane polymer chain, that is, at least one R or R' per siloxane molecule, contains olefinic unsaturation. The olefinic unsaturation is preferably a vinyl group, and the olefinic unsaturation may be a terminal group, or it may be positioned at a non-terminal point along the chain, or both. In a preferred embodiment of the present invention, R is a methyl radical; R' is a methyl radical or vinyl group, and at least one R' per siloxane chain or molecule is a vinyl group.

One class of vinyl organopolysiloxanes, the flex life of which can be improved by the present invention, has structural units corresponding to the formula:

 (2)

wherein R is an organic radical attached to silicon by a C-Si linkage and is selected from the group consisting of monovalent hydrocarbon radicals, halogenated monovalent hydrocarbon radicals and cyanoalkyl radicals; wherein R generally contains from 1 to about 30 carbon atoms with either straight or branched chains, preferably from 1 to about 12 carbon atoms and most preferably from 1 to about 8 carbon atoms; R' is an organic radical having olefinic unsaturation attached to silicon by a C-Si linkage and is selected from the group consisting of monovalent hydrocarbon radicals having olefinic unsaturation, halogenated monovalent hydrocarbon radicals having olefinic unsaturation and cyanoalkyl radicals having olefinic unsaturation; a has a value of from 0 to about 2.5, inclusive, and preferably from about 0.5 to about 2.1, inclusive, b has a value of from about 0.005 to about 2.0, inclusive, and the sum of a and b is equal to from 1.0 to 3, inclusive. Although R' is preferably vinyl, that is, $CH_2=CH-$, R' may contain from 1 to about 30 carbon atoms and is straight or branched chain, preferably from 1 to about 12 carbon atoms, and most preferably from 1 to about 8 carbon atoms and must contain olefinic unsaturation.

Included among the radicals which R in Formula 2 represents, are alkyl, such as, methyl, ethyl, propyl, isopropyl, butyl, octyl, dodecyl, and the like; cycloalkyl, such as, cyclopentyl, cyclohexyl, cycloheptyl, and the like,; aryl, such as, phenyl, naphthyl, tolyl, xylyl, and the like; aralkyl, such as, benzyl, phenylethyl, phenylpropyl, and the like; halogenated derivatives of the foresaid radicals including chlorophenyl, dibromophenyl, tetrachlorophenyl, difluorophenyl and the like; and cyanoalkyl, such as, beta-cyanoethyl, gamma-cyanopropyl, beta-cyanopropyl and the like. Moreover, Formula 2 is intended to include those materials wherein R is a mixture of the aforesaid radicals. In the preferred embodiments of the present invention, R is methyl. As indicated above, the vinyl organopolysiloxanes which may be used in the practice of the present invention, must be solids, that is, they must be gum or solid rubber, and in accordance with at least some of the objects of the present invention, they must be millable, workable or otherwise capable of having the vinyl acetate ethylene copolymer incorporated therein to form a uniform dispersion of the vinyl acetate ethylene copolymer in the rubber or elastomer.

Although R' in Formula 2 is most preferably vinyl, the silicone elastomers having olefinic unsaturation include other radicals having $—C=C—$ radicals, such as, allyl, propene radical, butene-1 radical, butene-2 radical, and the like, and halogenated and other derivatives thereof.

It is to be understood that the olefinic unsaturation in the silicone elastomers having olefinic unsaturation which may be used in the present invention, may have the olefinic unsaturation at the terminal end of the molecule or may have the olefinic unsaturation along the chain, or both, that is, the organopolysiloxanes may be vinyl terminated, may contain vinyl groups along the chain, or may be vinyl terminated and also contain vinyl groups along the chain. As indicated above, the preferred silicone elastomer having olefinic unsaturation is methyl vinyl silicone rubber.

Also included among the silicone elastomers having olefinic unsaturation which may be used in the practice of the present invention, are mixtures of vinyl organopolysiloxanes containing olefinic unsaturation as well as silicone elastomer copolymers having olefinic unsaturation.

The silicone elastomers having olefinic unsaturation to which the organic copolymer, that is, the vinyl acetate ethylene copolymer, may be added, are generally compounded rubbers and include in addition to the olefinic unsaturation portion as well as the saturated hydrocarbon portion, various silicone fluid portions, silica fillers, binders and other common additives, such as, zinc oxide and magnesium oxide. Any one or a number of combined fillers, fluids and other additives may be used in the gums and solids of the present invention. It is also possible to incorporate additives which soften the rubber or elastomer, and which promote the milling or mixing of the organic copolymer which improves the flex life, therein. Naturally other additives, such as colorants, and the like, may also be incorporated in the composition. These additives and modifiers may be included in the silicone elastomer having olefinic unsaturation prior to the mixing step wherein vinyl acetate ethylene copolymer is mixed in the silicone elastomer, or the additives may be incorporated in the silicone elastomers having olefinic unsaturation while the elastomers or rubbers are undergoing the mixing step, or in certain cases, the additives or modifiers can be incorporated in the silicone elastomers having olefinic unsaturation after the vinyl acetate ethylene copolymer has been uniformly dispersed in the silicone elastomer. Mixtures of silicone elastomers having olefinic unsaturation as well as organopolysiloxane copolymers having olefinic unsaturation and mixtures thereof can be utilized as the silicone elastomers having olefinic unsaturation in the process and compositions of the present invention.

The vinyl acetate ethylene copolymer composition used to modify the silicone elastomers having olefinic unsaturation to improve the flex life of the silicone elastomers are well known, and the particular vinyl acetate ethylene copolymer or copolymers used in the present invention are not critical as long as the copolymer or copolymers are capable of being uniformly dispersed within the silicone elastomer having olefinic unsaturation and as long as they are capable of curing or crosslinking in the presence of a free radical catalyst. Although in most cases the vinyl acetate ethylene copolymer incorporated in the silicone elastomers having olefinic unsaturation are solids, and the solids are uniformly dispersed in the silicone elastomers, the vinyl acetate ethylene copolymer or copolymers may be fluid or liquid, especially at the elevated temperature at which curing (crosslinking) is affected.

The amount of vinyl acetate ethylene copolymer which may be used to improve the flex life of silicone elastomers having olefinic unsaturation, is not critical. The upper limit in the amount of vinyl acetate ethylene copolymer which may be dispersed in the silicone elastomer having olefinic unsaturation, is limited only by that amount which adversely effects the properties of the silicone elastomer, such as, Shore A hardness, tensile strength, tear, elongation, elasticity, and the like, and/or that amount of vinyl acetate ethylene copolymer at which no additional improvement in flex life is realized in the silicone elastomer having olefinic unsaturation. Generally, in accordance with the practice of the present invention, it is preferred to have an upper limit of about 10% by weight (based upon the weight of the silicone elastomer) of vinyl acetate ethylene copolymer incorporated in the silicone elastomer having olefinic unsaturation. The lower limit in the amount of vinyl acetate ethylene copolymer which may be mixed in the silicone elastomer, is not critical as long as there is an improvement in the flex life of the silicone elastomer. In most embodiments, about 2.0% by weight to about 10.0% by weight vinyl acetate ethylene copolymer is incorporated in the silicone elastomer having olefinic unsaturation. In more preferred embodiments, about 4.0% to about 8.0% by weight vinyl acetate ethylene copolymer is mixed with the silicone elastomer having olefinic unsaturation.

In the process of the present invention, and in the silicone elastomers having olefinic unsaturation, the flex life of which is improved by the process of the present invention, it is critical that the vinyl acetate be uniformly mixed in, or uniformly dispersed throughout, the silicone elastomer. Thus, in mixing the vinyl acetate ethylene copolymer with the silicone elastomer, the mixing technique must be one which is capable of uniformly dispersing the vinyl acetate ethylene copolymer in the silicone elastomer. Conventional rubber blending techniques may be used to accomplish the uniform dispersion of the vinyl acetate ethylene copolymer in the silicone elastomer. For example, a typical rubber mill may be used to form the blend of the vinyl acetate ethylene copolymer and the silicone elastomer.

In order to improve the flex life of the silicone elastomers having olefinic unsaturation by modifying them with vinyl acetate ethylene copolymer, there must be a curing or crosslinking of the vinyl acetate ethylene copolymer and the olefinic portion of the silicone elastomer. Thus, it is necessary to incorporate a free radical catalyst which is capable of curing or crosslinking the blended materials. Any free radical catalyst which is vinyl specific, that is, which provides a vinyl specific cure, may be utilized to accomplish the crosslinking of the vinyl acetate ethylene copolymer and the silicone elastomer having olefinic unsaturation. Thus, the flex life of silicone elastomers having olefinic unsaturation is improved by mixing vinyl acetate ethylene copolymer and the silicone elastomer having olefinic unsaturation in the presence of a vinyl specific free radical catalyst, generally at an elevated temperature. In preferred embodiments, the free radical catalyst is mixed into the silicone elastomer along with the vinyl acetate ethylene copolymer. However, it is within the scope of the present invention to mix the free radical catalyst into the silicone elastomer prior to or following the mixing of the vinyl acetate ethylene copolymer in the silicone elastomer.

The free radical catalysts which cure or crosslink the mixture, may be any of the well-known or conventional free-radical initiators. These include, for example, organic peroxides, such as, benzoyl peroxide; and 2,4-dichlorobenzoyl peroxide; dialkyl peroxides, such as, di-tert-butyl peroxide and dicumyl peroxide; hydroperoxides, such as, tert-butyl hydroperoxide, cumyl hydroperoxide, and decylene hydroperoxide; cyclic peroxides, such as, 1,5-dimethylhexane-1,5-peroxide; peresters, such as, tert-butyl-peroxyisopropyl carbonate, tert-butylperoctoate, tertiary butylperlaurinate, 2,2-bis(tertiary-butyl-peroxy)-butane; and tert-butyl-peracetate. The well-known azo compounds are also useful herein as free-radical initiators. These include, for example, those azo compounds containing tertiary carbon atoms (that is, carbon atoms having no hydrogen attached thereto) attached to each nitrogen atom of the azo linkage. The remaining valences of the tertiary carbon are satisfied by nitrile radicals, carboxyalkyl radicals, cycloalkene radicals, alkyl radicals and radicals of the formula YOOC in which Y is an alkyl radical. Particularly useful and illustrative of the free-radical forming agents is the oil-soluble organic peroxide, dicumyl peroxide.

The amount of free radical catalyst or curing agent used in the method and composition of the present invention is not critical as long as there is a sufficient amount of free radical catalyst to affect the cure or crosslinking of the silicone elastomer having olefinic unsaturation and vinyl acetate ethylene copolymer. In certain embodiments, the flex life of the silicone elastomers having vinyl groups is improved by incorporating about 0.05 part by weight to about 10.0 parts by weight (based upon the weight of the silicone elastomer and the vinyl acetate ethylene copolymer) of the catalyst or curing agent in the blend of vinyl acetate ethylene copolymer and silicone elastomer having olefinic groups.

The mixture of silicone elastomers having olefinic unsaturation, vinyl acetate ethylene copolymer and free radical catalyst is heated at an elevated temperature to affect the curing or crosslinking of the mixture. The temperature of the curing is not critical and may vary as desired. Generally, however, the temperature should be sufficient to form free radicals at a rate such as to affect the curing of the silicone elastomers having olefinic unsaturation and the vinyl acetate ethylene copolymer in a reasonable length of time, but insufficient to result in grafting of the silicone elastomers having olefinic unsaturation or in degradation or decomposition of the components. The upper temperature limit is generally limited only by the fact that it is undesirable to cause grafting of the vinyl organopolysiloxane with the vinyl acetate ethylene copolymer. In most embodiments, the temperature may vary from about 35° C. to about 210° C., and preferably, from about 45° C. to about 125° C.

Curing time is not of great importance, as long as a sufficient amount of time is permitted to cure or crosslink the silicone elastomers having olefinic unsaturation. At the elevated temperature specified, the curing or crosslinking reaction is generally completed in about 10 minutes to about 10 hours, and more preferably, from about 0.5 hour to about 5.0 hours.

In one preferred embodiment, the flex life of silicone elastomers having olefinic unsaturation is improved by first milling the vinyl acetate ethylene copolymer to form a gum of the vinyl acetate ethylene copolymer, adding the silicone elastomer having olefinic unsaturation to the vinyl acetate ethylene copolymer gum and mixing to form a blend of the silicone elastomer having olefinic unsaturation and the vinyl acetate ethylene copolymer. In other embodiments, the silicone elastomer copolymer having olefinic unsaturation is milled to form a gum; the vinyl acetate ethylene copolymer is added to the silicone elastomer gum and milled or blended so that the vinyl acetate ethylene copolymer is uniformly dispersed in the silicone elastomer having olefinic unsaturation. The vinyl acetate ethylene copolymer is generally more uniformly dispersed in the silicone elastomer when the vinyl acetate ethylene copolymer is softened prior to adding it to the silicone elastomer. In certain embodiments, heat may be provided to promote the softening of the vinyl acetate ethylene copolymer to promote the mixing or milling of the vinyl acetate ethylene copolymer and the silicone elastomer.

In one embodiment of the present invention, there is provided a method of improving the flex life of silicone elastomers having olefinic unsaturation comprising, milling vinyl acetate ethylene copolymer for a sufficient time to provide a softened gum; adding a silicone elastomer having olefinic unsaturation such that the amount of vinyl acetate ethylene copolymer is about 2.0% to about 10.0% by weight of the silicone elastomer having olefinic unsaturation; adding a sufficient amount of a free radical catalyst to crosslink the silicone elastomer having olefinic unsaturation and the vinyl acetate ethylene copolymer; milling the mixture of free radical catalyst, vinyl acetate ethylene copolymer and silicone elastomer having olefinic unsaturation until the vinyl acetate ethylene copolymer is uniformly dispersed in the silicone elastomer to form a blend; heating the mixture of free radical catalyst, vinyl acetate ethylene copolymer and silicone elastomer having olefinic unsaturation at a temperature sufficient to cure the silicone elastomer; and cooling the cured silicone elastomer. The mixture is generally cooled to about room temperature after the curing or crosslinking is complete. In the method of the present invention, heat may optionally be provided at each step of the process. Thus, heat may optionally be provided when the vinyl acetate ethylene copolymer is milled to provide a softened gum, when the silicone elastomer is added to the vinyl acetate ethylene copolymer, and/or when the catalyst is added to the mixture. The heat may be applied continuously or intermittently to enhance the softening and milling of the ingredients, and the amount of heat optionally provided at any step is not critical and one skilled in the art can apply heat and adjust temperatures to achieve the desired result of each step.

In another embodiment of the present invention, there is also provided a method of improving the flex life of silicone elastomers having olefinic unsaturation comprising milling silicone elastomer having olefinic unsaturation for a sufficient time to provide a softened gum; adding vinyl acetate ethylene copolymer such that the amount of vinyl acetate ethylene copolymer is about 2.0% to about 10.0% by weight of the silicone elastomer having olefinic unsaturation; adding a sufficient amount of a free radical catalyst to crosslink the silicone elastomer having olefinic unsaturation until the vinyl acetate ethylene copolymer is uniformly dispersed in the silicone elastomer to form a blend; heating the mixture of free radical catalyst, vinyl acetate ethylene copolymer and silicone elastomer having olefinic unsaturation at a temperature sufficient to cure the silicone elastomer; and cooling the cured silicone elastomer. As indicated above, heat may optionally be provided at various steps of the process. Furthermore, the sequence of the steps of adding the silicone elastomer, adding the vinyl acetate ethylene copolymer, adding the free radical catalyst and milling the mixture is not critical, and they may be carried out in any sequence as desired to disperse the copolymer and the catalyst in the silicone elastomer. All steps can also be carried out under continuous milling.

The silicone elastomers having improved flex life comprising a silicone elastomer having olefinic unsaturation and about 2.0% to about 10% by weight vinyl acetate ethylene copolymer crosslinked in the presence of a free radical catalyst is useful for embedding electrical apparatus, for insulating wires and for various molded rubber parts, such as, seals, gaskets and the like.

The following examples are set forth to more fully and clearly illustrate the present invention and are intended to be, and should be construed as being, exemplary and not limitative of the invention. Unless otherwise stated, all parts and percentages are by weight.

The improved flex life of the silicone elastomers having olefinic unsaturation has been observed with the addition of minor amounts of vinyl acetate ethylene copolymer without adversely effecting other physical properties of the rubber. The observed flex life is identified as the DeMattia flex. The DeMattia flex test is a standard test method for rubber deterioration-crack growth identified as ASTM D813-59 (reapproved 1976) and is shown in the *Annual Book of ASTM Standards, Part* 37, pages 175-177. The DeMattia flex test covers the determination of crack growth of vulcanized rubber when subjected to repeated bend flexing. It is particularly applicable to tests of synthetic rubber compounds which resist the initiation of cracking due to flexing when tested by method B of ASTM methods D-430, rubber deterioration-dynamic fatigue. The measurements are made on a DeMattia flexing machine which has an adjustable stationary head or member provided with suitable grips for holding one end of each of the test specimen in a fixed position and a similar reciprocating member for holding the other end of each of the specimen. The reciprocating member is so mounted that its motion is straight in the direction of and in the same plane as the center line between the grips. A mold for curing individual test specimen is required, preferably of a multiple cavity design and having adequate overflow cavities. The cavity plate has a minimum thickness of 13 mm and the cover plate a minimum thickness of 6 mm. Further details can be obtained by consulting ASTM D 813-59.

EXAMPLE 1

A methyl vinyl silicone rubber compound containing 66% by weight of 0.05% vinyl polymer, 28.5% by weight dimethylpolymer and 5.0% by weight of a 13.5% vinyl polymer with the balance of the rubber being silicone fluid, silica fillers and a zinc oxide/magnesium master batch, was molded in test slabs for 10 minutes at 80.5° C. (350° F.) after being catalyzed with 1.0 part by weight of 40% active dicumyl peroxide. A second sample of the silicone rubber described above was prepared, and 6% by weight of a vinyl acetate ethylene copolymer identified as Vynathene 904 having 52% vinyl acetate content (Vynathene is a trademark of USI Chemical) was blended into the rubber (after the vinyl acetate ethylene copolymer was milled to form a softened gum) until the vinyl acetate ethylene copolymer was uniformly dispersed therein, and thereafter the sample was molded under the conditions described above. The data comparing the methyl vinyl silicone rubber compound with and without the vinyl acetate ethylene copolymer uniformly dispersed therein is shown in Table 1 below.

TABLE 1

Comparison of Physical Properties of Methyl Vinyl Silicone Rubber With and Without Vinyl Acetate Ethylene Copolymer

| PHYSICAL PROPERTIES | SILICONE RUBBER ALONE | *MODIFIED SILICONE RUBBER |
|---|---|---|
| Shore A Hardness | 60 | 60 |
| Tensile Strength, psi | 1200 | 1250 |
| Tear, Die B | | |
| Room Temp | 215 | 215 |
| 100° C. | 135 | 130 |
| Elongation, % | 700 | 670 |
| 100% Modulus | 200 | 260 |
| DeMattia Flex | 350,000 | 750,000 |

*Containing 6% by weight vinyl acetate ethylene copolymer.

A comparison of the physical properties shown in Table 1 for silicone rubber alone and the modified silicone rubber, that is, the silicone rubber containing 6% by weight vinyl acetate ethylene copolymer, shows that by adding the vinyl acetate ethylene copolymer to the silicone rubber having olefinic unsaturation, that is, to methyl vinyl silicone rubber, the physical properties remain substantially unchanged while the DeMattia flex life of the silicone rubber more than doubles, going from 350,000 to 750,000. Thus, it can be seen that vinyl acetate ethylene copolymer as an additive or modifier increases the flex life of silicone rubbers having olefinic unsaturation when used in accordance with the process of the present invention without any substantial adverse effect upon the other properties of the silicone rubber.

EXAMPLES 2–6

Silicone rubber samples were prepared in accordance with the procedure set forth in Example 1 above. Vinyl acetate ethylene copolymer was milled until a softened gum was formed, and a silicone elastomer having olefinic unsaturation was added thereto along with catalyst, and after the vinyl acetate ethylene copolymer was uniformly dispersed in the silicone elastomer, the blend was placed in a mold and heated for about 10 minutes at 80.5° C. (350° F.) In each of the examples, 1.0 part by weight (based upon the weight of the silicone elastomer and the vinyl acetate ethylene copolymer) of 40% active dicumyl peroxide catalyst was added to each sample.

The silicone rubber was a methyl vinyl silicone rubber compound comprising 66% by weight of 0.05% vinyl polysiloxane, 28.5% by weight dimethyl polysiloxane and 5.0% by weight of 13.5% vinyl polysiloxane, the balance of the compound being silicone fluid, and silica fillers.

Example 2 shown in Table 2 below contained no modifier or additive, that is, it contained no vinyl acetate ethylene copolymer. Example 3 shown in Table 2 below contained 6% by weight (based upon the weight of the silicone rubber compound) of vinyl acetate ethylene copolymer identified as Vynathene 901-25. Example 4, shown in Table 2 below, contained 6% by weight (based upon the weight of the silicone rubber compound (of Vynathene 907. Vynthene 907 has a 60% vinyl acetate content. Example 5, shown in Table 2 below, contained 4% by weight (based upon the weight of the silicone rubber compound) of Vynathene 904-25. Example 6, shown in Table 2 below, contained 6% by weight (based upon the weight of the silicone rubber) of Vynathene 904-25. In each of Examples 3–6, the silicone rubber compound was the rubber described above for Example 2.

The physical properties for each of the compositions are shown in Table 2 below. Table 2 below shows two different DeMattia flex tests using different input batches of the silicone rubber and modified silicone rubber.

TABLE 2

Comparison of Physical Properties of Methyl Vinyl Silicone Rubber With and Without Vinyl Acetate Ethylene Copolymer

| | EXAMPLES | | | | |
|---|---|---|---|---|---|
| | SILICONE RUBBER | *MODIFIED SILICONE RUBBER | | | |
| PHYSICAL PROPERTIES | 2 | 3 | 4 | 5 | 6 |
| Shore A Hardness | 62 | 66 | 61 | 62 | 60 |
| Tensile strength, psi | 1202 | 1187 | 1215 | 1113 | 1250 |
| Elongation, % | 717 | 654 | 691 | 715 | 672 |
| Tear, Die B, RT** | 217 | 246 | 195 | 215 | 216 |
| 100° C. | 134 | 127 | 130 | 130 | 130 |
| 50% Modulus, psi | 175 | 197 | 158 | — | 175 |
| 100% Modulus, psi | 223 | 278 | 235 | — | 259 |
| DeMattia Flex | 300,000 | 993,600 | 700,000 | 455,000 | 750,000 |
| Different Input Batch | 220,000 | 600,000 | — | — | 700,000 |

*Containing vinyl acetate ethylene copolymer.
**RT = room temperature.

An examination of the data in Table 2 shows that the physical properties of the modified silicone rubbers were substantially the same as the silicone rubber without vinyl acetate ethylene copolymer blended therein and crosslinked while the DeMattia flex tests show substantial improvement in the flex life of the modified silicone rubbers containing varying amounts of vinyl acetate ethylene copolymer.

Under conditions similar to Example 1 above, ethylene propylene copolymer was uniformly dispersed in methyl vinyl silicone rubber, and there was no improvement in the DeMattia flex test.

In accordance with the present invention, a method has been provided for improving the flex life of silicone elastomers having olefinic unsaturation, and silicone elastomers containing olefinic unsaturation, for example, vinyl organopolysiloxanes, having improved flex life have been prepared by the process of the present invention. Furthermore, the flex life of silicone elastomers having olefinic unsaturation has been improved by using a polymeric filler material, that is, vinyl acetate ethylene copolymer, without compromising or otherwise causing an adverse effect on other physical properties of the elastomer compound.

While other modifications of the invention and variations thereof which may be employed within the scope of the invention, have not been described, the invention is intended to include such modifications as my be embraced within the following claims.

What is claimed is:

1. A method of improving the flex life of silicone elastomers having olefinic unsaturation, comprising:
   I. mixing
      (a) from about 2% to about 10% by weight vinylacetate ethylene copolymer based on the weight of (b), and
      (b) a silicone elastomer having olefinic unsaturation in the presence of
      (c) a free radical catalyst;
   II. heating the mixture of step I at an elevated temperature to cure or crosslink the mixture and
   III. cooling the mixture.

2. A method of improving the flex life of silicone elastomers having olefinic unsaturation in accordance with claim 1 wherein about 4.0% to about 8.0% by weight vinyl acetate ethylene copolymer is mixed with the silicone elastomer.

3. A method of improving the flex life of silicone elastomers having olefinic unsaturation in accordance with claim 1 wherein the vinyl acetate ethylene copolymer is milled to form a gum, and the silicone elastomer having olefinic unsaturation is added to the vinyl acetate ethylene copolymer gum and mixed to form a blend of the silicone elastomer having olefinic unsaturation and the vinyl acetate ethylene copolymer.

4. A method of improving the flex life of silicone elastomers having olefinic unsaturation in accordance with claim 1 wherein the free radical catalyst is a peroxide catalyst.

5. A method of improving the flex life of silicone elastomers having olefinic unsaturation in accordance with claim 1 wherein the free radical catalyst is dicumyl peroxide.

6. A method of improving the flex life of silicone elastomers having olefinic unsaturation in accordance with claim 1 wherein about 0.05 part by weight to about 10.0 parts by weight of peroxide catalyst is mixed with the vinyl acetate ethylene copolymer and the silicone elastomer having olefinic groups.

7. A method of improving the flex life of silicone elastomers having olefinic unsaturation in accordance with claim 1 wherein the mixture is heated at a temperature of about 100° C. to about 210° C.

8. A method of improving the flex life of silicone elastomers having vinyl groups in accordance with claim 1 further comprising forming the heated mixture into a desired shape and cooling the mixture.

9. A method of improving the flex life of silicone elastomers having olefinic unsaturation in accordance with claim 1 wherein the silicone elastomer is defined by the unit formula

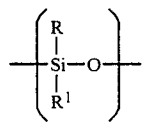

where each R and R' is a monovalent hydrocarbon radical, a substituted hydrocarbon radical or mixtures thereof, and where at least one R or R' per siloxane polymer chain contains olefinic unsaturation.

10. A method of improving the flex life of silicone elastomers having olefinic unsaturation in accordance with claim 9 wherein the silicone elastomer is a methyl vinyl silicone rubber.

11. A method of improving the flex life of silicone elastomers having olefinic unsaturation comprising:
   (a) milling vinyl acetate ethylene copolymer for a sufficient time to provide a softened gum;
   (b) adding a silicone elastomer having olefinic unsaturation such that the amount of vinyl acetate ethylene copolymer is about 2.0% to about 10.0% by weight of the silicone elastomer having olefinic unsaturation;
   (c) adding a sufficient amount of a free radical catalyst to crosslink the silicone elastomer having olefinic unsaturation and the vinyl acetate ethylene copolymer;
   (d) milling the mixture of free radical catalyst, vinyl acetate ethylene copolymer and silicone elastomer having olefinic unsaturation until the vinyl acetate ethylene copolymer is uniformly dispersed in the silicone elastomer;
   (e) heating the mixture of free radical catalyst, vinyl acetate ethylene copolymer and silicone elastomer having olefinic unsaturation at a temperature sufficient to cure the silicone elastomer; and
   (f) cooling the cured silicone elastomer.

12. A method of improving the flex life of silicone elastomers having olefinic unsaturation in accordance with claim 11 further comprising forming the mixture into a suitable article and thereafter cooling the mixture.

13. A method of improving the flex life of silicone elastomers having olefinic unsaturation in accordance with claim 11 wherein the free radical catalyst is dicumyl peroxide.

14. A method of improving the flex life of silicone elastomers having olefinic unsaturation in accordance with claim 11 further comprising heating the vinyl acetate ethylene copolymer while milling the vinyl acetate ethylene copolymer to provide a softened gum.

15. A method of improving the flex life of silicone elastomers having olefinic unsaturation in accordance with claim 11 further comprising milling the silicone elastomer having olefinic unsaturation to provide a softened gum prior to adding the elastomer to the vinyl acetate ethylene copolymer.

16. A method of improving the flex life of silicone elastomers having olefinic unsaturation comprising:
   (a) milling silicone elastomer having olefinic unsaturation for a sufficient time to provide a softened gum;
   (b) adding vinyl acetate ethylene copolymer such that the amount of vinyl acetate ethylene copolymer is about 2.0% to about 10.0% by weight of the silicone elastomer having olefinic unsaturation;
   (c) adding a sufficient amount of a free radical catalyst to crosslink the silicone elastomer having olefinic unsaturation and the vinyl acetate ethylene copolymer;
   (d) milling the mixture of free radical catalyst, vinyl acetate ethylene copolymer and silicone elastomer having olefinic unsaturation until the vinyl acetate ethylene copolymer is uniformly dispersed in the silicone elastomer;
   (e) heating the mixture of free radical catalyst, vinyl acetate ethylene copolymer and silicone elastomer having olefinic unsaturation at a temperature sufficient to cure the silicone elastomer; and (f) cooling the cured silicone elastomer.

17. A method of improving the flex life of silicone elastomers having olefinic unsaturation in accordance with claim 16 further comprising forming the mixture into a suitable article and thereafter cooling the mixture.

18. A method of improving the flex life of silicone elastomers having olefinic unsaturation in accordance with claim 16 wherein the free radical catalyst is dicumyl peroxide.

19. A method of improving the flex life of silicone elastomers having olefinic unsaturation in accordance with claim 16 further comprising heating the vinyl acetate ethylene copolymer to provide a softened gum.

20. A method of improving the flex life of silicone elastomers having olefinic unsaturation in accordance with claim 16 further comprising milling the vinyl acetate ethylene copolymer to provide a softened gum prior to adding the copolymer to the silicone elastomer having olefinic unsaturation.

21. A silicone elastomer having improved flex life comprising a silicone elastomer having olefinic unsaturation and about 2.0% to about 10.0% by weight vinyl acetate ethylene copolymer crosslinked in the presence of a free radical catalyst.

22. The silicone elastomer of claim 21 wherein the silicone elastomer having olefinic unsaturation is defined by the unit formula

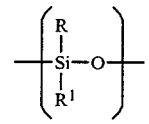

where each R and R' is a monovalent hydrocarbon, a substituted hydrocarbon radical or mixtures thereof, and where at least one R or R' per polymer chain is an unsaturated olefinic radical.

23. The silicone elastomer of claim 22 wherein the silicone elastomer is methyl vinyl silicone rubber.

24. The silicone elastomer of claim 22 wherein R is methyl radical, and R' is methyl radical or vinyl group, and at least one R' per siloxane chain is a vinyl group.

* * * * *